H. C. F. OEHLECKER.
Dental Articulators.
No. 198,853. Patented Jan. 1, 1878.
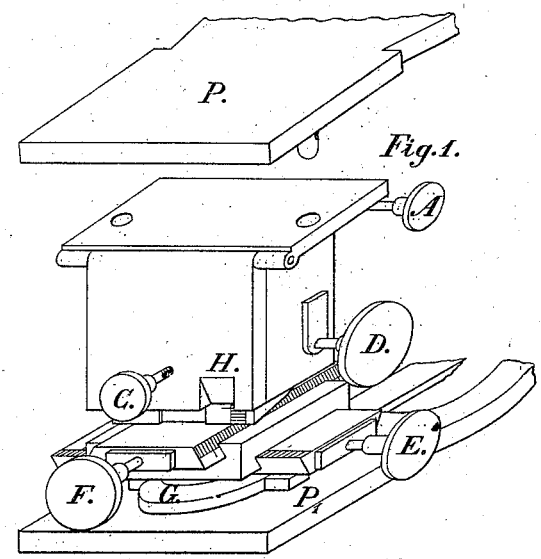
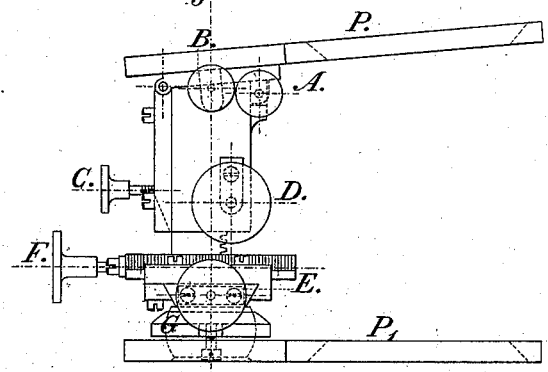
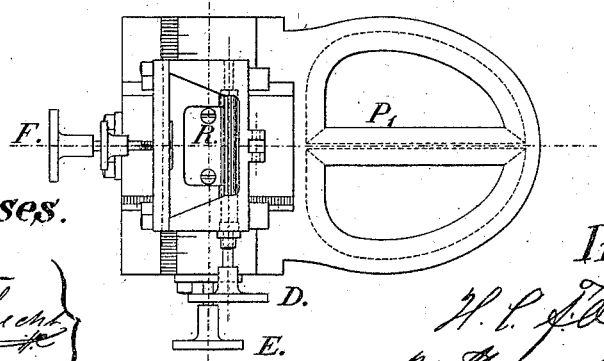

UNITED STATES PATENT OFFICE.

HEINRICH C. F. OEHLECKER, OF HAMBURG, GERMANY.

IMPROVEMENT IN DENTAL ARTICULATORS.

Specification forming part of Letters Patent No. 198,853, dated January 1, 1878; application filed December 10, 1877.

*To all whom it may concern:*

Be it known that I, HEINRICH CARL FRANZ OEHLECKER, of Hamburg, Germany, have invented certain new and useful Improvements in Dental Apparatus; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of my invention relates to an improvement in the construction of articulators employed for setting the teeth in the manufacture of artificial sets of teeth, and the accompanying drawing represents my invention.

The molds upon which the teeth of the upper and lower jaws are placed are fixed to the plates P and P' by means of plaster. The plate P can be thrown over with the mold of the upper jaw thereto attached after having withdrawn the pin A, or else it can be taken off altogether by drawing out the pins B, as is shown in Figure 1 of the accompanying drawing, in order that the setting of the teeth in the one or the other mold can be effected conveniently, and that one of the molds should not, in this respect, interfere with the other.

Fig. 2 shows a view of the articulator; and Fig. 3, a plan of the same, the upper plate P for the upper jaw being removed.

In order to obtain the necessary sure and precise setting of sets of teeth of the upper and lower jaws in respect to each other, in the manufacture of artificial sets of teeth by means of the articulator, the latter is provided with a horizontal and a vertical slide, conjointly with a socket-joint, G, which slide and socket-joint I consider as new.

How the separate motions can be effected is seen by referring to the accompanying drawing, as follows: The vertical motion is effected by turning the button D, with its pinion R, which latter elevates and lowers the slide on the rack. The horizontal motions from right to left, and vice versa, are obtained by means of the screw E, and backward and forward, and vice versa, by means of the screw F. All other motions which might be desirable are effected by means of the socket-joint G.

The screw C and the small screws of the socket-joint serve to fix the upper portion of the apparatus.

The scales arranged upon the horizontal and vertical slides serve to gage the motions.

It is evident from the foregoing that the articulator which I have invented combines the ease and facility of obtaining every desirable motion with accuracy and convenience of execution for manufacturing artificial sets of teeth.

I claim as my invention—

1. The combination of the horizontal and vertical slides and the socket-joint G with the plates P and P', arranged to operate in the manner and for the purpose substantially as set forth.

2. The hinged plate P, provided with pins B and A, in combination with the sliding block, arranged and operating for the purpose herein described.

H. C. F. OEHLECKER.

In presence of—
PAUL MÖLLER,
ALEXANDER SPECHT.